(12) United States Patent
Siitari

(10) Patent No.: US 6,213,615 B1
(45) Date of Patent: Apr. 10, 2001

(54) METHOD FOR ADJUSTING THE COLOR TEMPERATURE IN A BACK-LIT LIQUID CRYSTAL DISPLAY AND A BACK-LIT LIQUID CRYSTAL DISPLAY

(75) Inventor: Kimmo Siitari, Salo (FI)

(73) Assignee: Nokia Display Products Oy, Salo (FI)

( * ) Notice: Subject to any disclaimer, the term of this patent is extended or adjusted under 35 U.S.C. 154(b) by 0 days.

(21) Appl. No.: 09/187,638

(22) Filed: Nov. 6, 1998

(30) Foreign Application Priority Data

Nov. 7, 1997 (FI) ........................................................ 974167

(51) Int. Cl.⁷ ........................................................ F21V 7/04
(52) U.S. Cl. ............................ 362/31; 362/251; 362/295; 362/231; 349/61; 349/68
(58) Field of Search .............................. 362/31, 552, 561, 362/251, 230, 231, 295; 355/3 R; 349/61, 68

(56) References Cited

U.S. PATENT DOCUMENTS 4,571,053 * 2/1986 Kasama et al. ........................ 355/3 R
5,211,463 * 5/1993 Kalmanash .............................. 362/26
5,250,937 * 10/1993 Kikuo et al. ............................ 345/89

FOREIGN PATENT DOCUMENTS 0560614  9/1993  (EP) .
9504300  2/1995  (WO) .

* cited by examiner

*Primary Examiner*—Sandra O'Shea
*Assistant Examiner*—Bertrand Zeade
(74) *Attorney, Agent, or Firm*—Ware, Fressola, Van Der Sluys & Adolphson LLP

(57) ABSTRACT

The invention relates to a method for adjusting the colour temperature in a liquid crystal display with background lighting. According to the invention, the liquid crystal display is lit by two or more background light lamps with different colour temperatures (LAMP 1, 2, 3, 4, 5), the colour temperature range of the background light is extended and better opportunities for adjusting the colour temperature by changing the pass rate of the light are provided. In a more advanced solution, background light lamps with different colour temperatures (LAMP 1, 2, 3, 4, 5) are switched on (S1) separately for setting the colour temperature of the display, and furthermore, the brightness of the background light lamps (LAMP 1, 2, 3, 4, 5) with different colour temperatures can be adjusted separately for setting the colour temperature.

16 Claims, 2 Drawing Sheets

METHOD FOR ADJUSTING THE COLOR TEMPERATURE IN A BACK-LIT LIQUID CRYSTAL DISPLAY AND A BACK-LIT LIQUID CRYSTAL DISPLAY

TECHNICAL FIELD

The invention relates to a method for adjusting the colour temperature in a back-lit Liquid Crystal Display (LCD) and a back-lit liquid crystal display.

BACKGROUND OF THE INVENTION

The colour temperature is adjusted in display devices in order that the picture can be seen subjectively in the same way in different lighting conditions. The natural light of the sun has a low colour temperature, about 5000 K. In artificial lighting, a filament lamp has a low colour temperature, but a fluorescent lamp has a high colour temperature, about 9000 K. Thus the colour temperature of the lighting of the environment can vary greatly, in the range 5000 to 10000 K. White material reflects all the wavelengths of light, and thus the lighting of the environment has the strongest effect on the observed colour temperature reflected by white material. With other colours this effect is smaller. Because of the difference of the colour temperatures of different lighting, a material seen as white in sunlight is seen as bluish in fluorescent lighting, for example.

When it is desired that the colours shown on the display screen, particularly white, are seen similarly as a material of corresponding colour beside the display is seen, the colour temperature of the display device must be adjusted to correspond to the lighting.

In a prior art solution, the adjustment of the colour temperature is carried out by changing the amount of blue and red colour in the white colour shown on the display. The white colour is shown on the display as a combination of red, green and blue.

The operation of the known liquid crystal displays is usually based on adjusting the amount of background light allowed to pass by means of a liquid crystal element. When the purpose is to show a fully lit bright point, the light is let through the element as well as possible. When the purpose is to show a black point, the light is prevented from passing through the element. Unlike the phosphorus surface of a cathode-ray tube or a light emitting diode (LED), the liquid crystal element does not produce light itself, but needs a light source for displaying a bright point. The environment and/or separate background lighting devices function as this source of light. The light of the environment can be led from the back to the liquid crystal element or from the front through the liquid crystal element and then reflected back with a mirror. The background lighting is created with lamps and reflected on the full picture area of the liquid crystal element with background light panels. Background lighting is particularly advantageously used in monitors, because the light of the environment alone is not sufficient to produce a picture with sufficient brightness.

FIG. 1 shows the mechanical principle of a prior art back-lit liquid crystal panel. The backlight lamps 1a, 1b, 1c, 1d, of which there are preferably 2 or 4, light through reflectors 2a, 2b the background light panel 3. The background light panel 3 contains a background light conductor, which divides the light over an area corresponding to the whole display screen on the liquid crystal element 4. In the example of FIG. 1, the bright items of element 4 starting from item 4a let light through, but the crossed items starting from item 4b do not. In the colour filter 5, the red, green and blue filter items which let through only light that is the colour of the filter item correspond to the items of element 4. The liquid crystal element 4 and the colour filter 5 have in practice been implemented as a solid component, which is shown by the line 6. A white point is formed on the display by conducting the background light with the liquid crystal element 4 to the red, green and blue filter items corresponding to the point. This is done by brightening the items of the liquid crystal element 4—three items of different colours for one point—which are all brightened. Red, green or blue and mixtures of these colours are formed by conducting the background light with the liquid crystal element 4 to the filter items corresponding to these colours. The light intensity of the liquid crystal panel is adjusted by changing the brightness of the background light lamps 1a, 1b, 1c, 1d.

The colour temperature is adjusted in the prior art liquid crystal panels by changing the pass rate of the background light by means of a liquid crystal element 4. When the purpose is to have a high colour temperature, such as 9300 K, which creates a bluish image, the passing of the red light is prevented more than the passing of the blue light. An adjustment of this type is here called passive adjustment, because the adjustment is based on preventing the passing of the component of light through the panel.

The prior art devices have the problem that when light is produced with background lamps, which have their own colour temperatures, like filament lamps and fluorescent tubes, it is necessary to prevent a very large amount of a colour which is not needed much for the desired colour temperature in question. As a result of this, the total light intensity is reduced substantially, and the picture gets dimmer. The colour temperature of a background light lamp is generally about 5000 to 6000 K, but the desired colour temperature of the picture can be, for example, 9000 K, and therefore a large part of the light must be prevented. Because of this, the adjustment range of liquid crystal panels is narrow.

SUMMARY OF THE INVENTION

The purpose of the invention is to eliminate the above mentioned known drawbacks of liquid crystal monitors.

The method according to the invention is a method for adjusting a colour temperature in a back-lit liquid crystal display, wherein the liquid crystal display is lit by two or more background light lamps with different colour temperatures. The device according to the invention is a back-lit liquid crystal display, wherein it comprises two or more background light lamps with different colour temperatures (LAMP 1, 2, 3, 4, 5) for background lighting of the liquid crystal display and a switch for lighting the background light lamps with different colour temperatures (LAMP 1, 2, 3, 4, 5). The preferred embodiments of the invention are set forth in the dependent claims.

The invention relates to a method for adjusting the colour temperature in a liquid crystal display with background lighting. According to the invention, the liquid crystal panel is lit by two or more background light lamps with different colour temperatures. The use of lamps with different colour temperatures for background lighting extends the colour temperature range of the background light and provides better opportunities for adjusting the colour temperature by changing the pass rate of the colours.

In one embodiment of the method, background light lamps with different colour temperatures are switched on separately for setting the colour temperature of the display. For example, use is made of two lamps, the first of which has a colour temperature of 6000 K and the second 9000 K. In order to form a suitable colour temperature, either the first or second lamp is switched to the display device. According to this example, two different colour temperatures are obtained for the display. If both lamps were switched on, the colour temperature would be between the two, but the light intensity would be twice as high as with one lamp.

In one application of the method, the brightness of the background light lamps with different colour temperatures is adjusted separately for setting the colour temperature. For example, use is made of two lamps, the first of which has a colour temperature of 6000 K and the second 9000 K. For setting a suitable colour temperature for the display device, the first lamp is lit, the first and the second lamp are adjusted flexibly, keeping the brightness the same, or the second lamp is lit alone. According to this example, the colour temperature can be adjusted flexibly without changing the brightness from 6000 to 9000 K.

The invention also relates to a liquid crystal display with background lighting. According to the invention, the liquid crystal display comprises two or more background light lamps with different colour temperatures for the background lighting of the liquid crystal panel, and a switch for lighting the background light lamps with different colour temperatures.

In one embodiment of the invention the switch is an on-off switch.

In another embodiment of the invention the switch is continuously adjustable, enabling gradual adjustment from off to on.

In one embodiment of the invention, the light of the background lamps is transferred by means of a photoconductor to the liquid crystal display. Thus the location of the background light lamps can be selected freely within the display device and they need not be in the immediate vicinity of the display element, preferably at the ends of the display element.

The invention also relates to a back-lit liquid crystal display. According to the invention, it comprises two or more background light lamps with different colour temperatures for the background lighting of the liquid crystal panel, and a switch for lighting the background light lamps with different colour temperatures.

In one embodiment of the invention, the switch is a selection switch. The selection switch is used e.g. to switch on the lamps of one colour temperature at a time, but possibly also lamps of two or more colour temperatures.

In one embodiment of the invention, the switch is a continuously adjustable controller that enables gradual adjustment from the lighting of the lamp with the lowest colour temperature to the lighting of the lamp with the highest colour temperature, so that the total light intensity is kept essentially the same. The controller is used to dim the lamps so that the lighting is transferred from lamps with different colour temperatures to others flexibly.

In one embodiment of the invention, it also comprises a light conductor for transferring the light from the background light lamps to the liquid crystal display.

The invention has the advantage that the adjustment range of the colour temperature in the liquid crystal element can be extended with lamps of different colour temperatures without changing the switching of the prior art liquid crystal display.

The invention also has the advantage that the adjustment of the colour temperature can be carried out only by adjusting the brightness of lamps with different colour temperatures without making a colour adjustment in the liquid crystal element.

BRIEF DESCRIPTION OF THE DRAWINGS

In the following the invention will be described in more detail with reference to the accompanying drawing, in which.

BEST MODE FOR CARRYING OUT THE INVENTION

Figure 1:
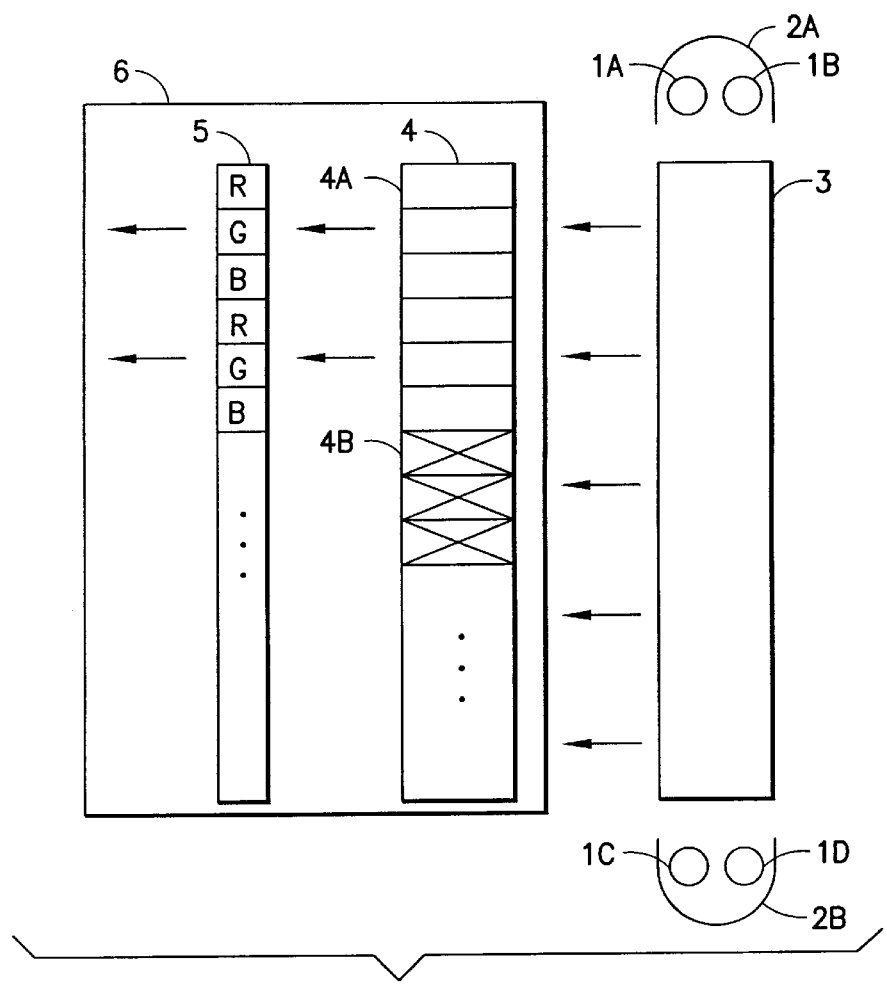
FIG. 1 shows a prior art liquid crystal display with background lighting.

FIG. 1 has been dealt with in connection with the prior art description.

Figure 2:
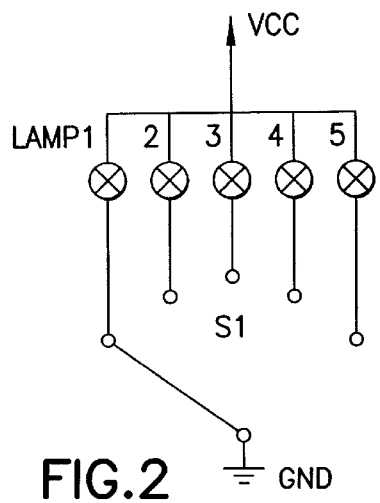
FIG. 2 shows the parts of a switching according to the invention that are essential for the invention in a block diagram.

FIG. 2 shows the essential parts of a simple lighting switching according to the invention. Lamps with different colour temperatures LAMP 1, 2, 3, 4, 5 are switched to the operating voltage VCC. The switch S1 is used to switch grounding GND to these lamps LAMP 1, 2, 3, 4, 5 according to selection. Thus the switched lamp LAMP 1 is lit, and by turning the switch S1, one of the lamps LAMP 1, 2, 3, 4, 5 can be selected to create a suitable colour temperature. The colour temperatures of the lamps LAMP 1, 2, 3, 4, 5 are preferably in the order from the lowest to the highest, and thus turning the switch S1 from left to right raises the colour temperature logically.

Figure 3:
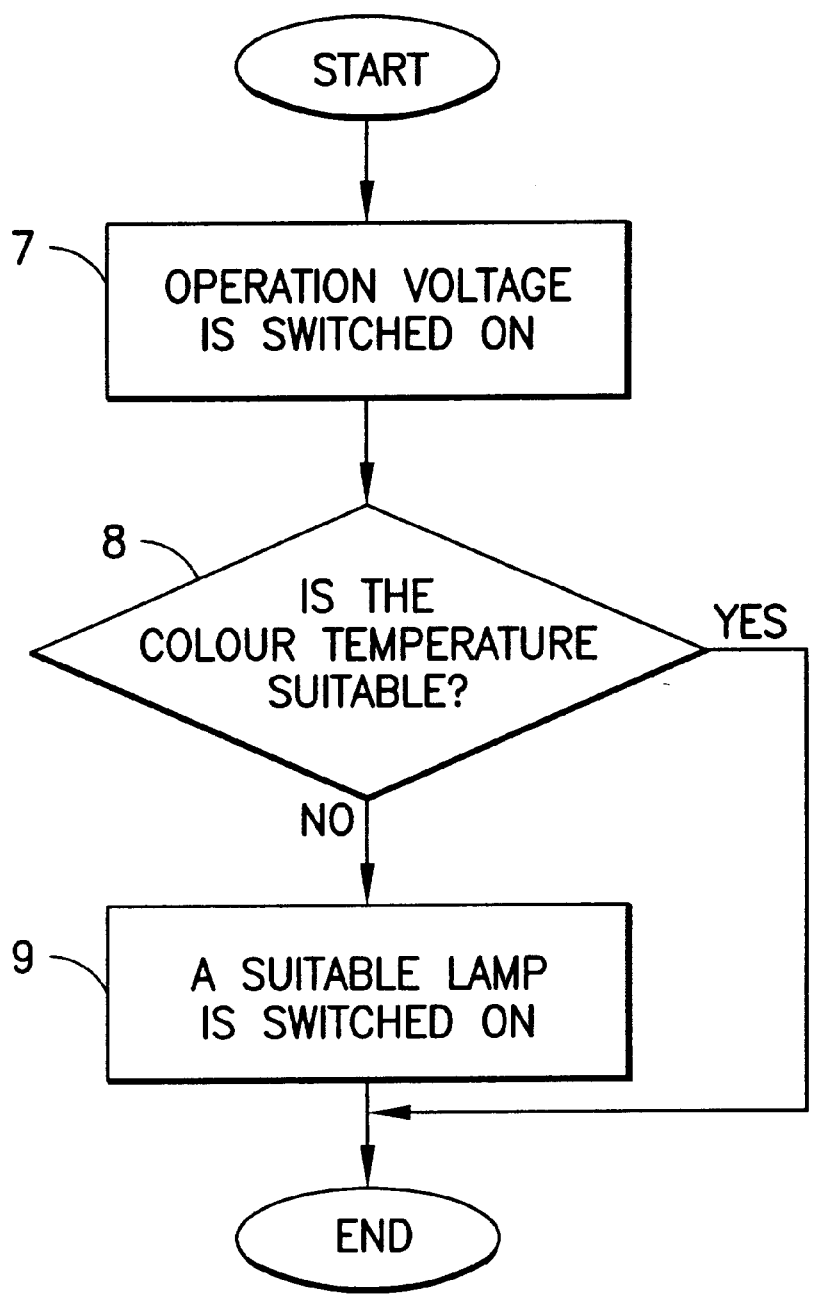
FIG. 3 shows the selection of colour temperature according to the invention in a flow chart.

FIG. 3 shows a selection of the colour temperature according to the invention in a simple flow chart. The operating voltage is switched 7 to the display device, whereby the background lighting is switched on with a lamp of the colour temperature that was previously selected. The user sees 8 if the colour temperature of the background light is suitable. If the colour temperature is suitable, the process goes to the end. If the colour temperature is not suitable, another, suitable lamp is switched on to achieve the desired colour temperature.

Figure 2A:
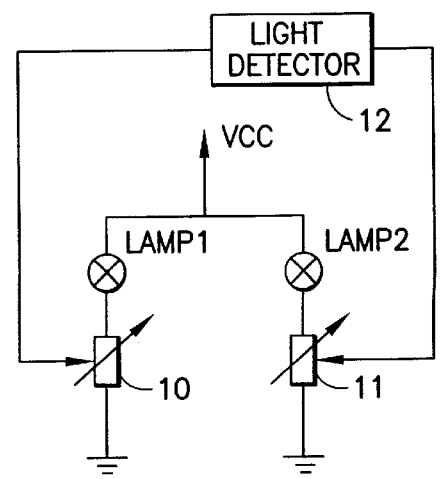
FIG. 2A shows an alternative embodiment of the invention, using two lamps that are individually continuously adjustable, such as at least in part based upon ambient light detection.

As seen in FIG. 2A by way of example, a more advanced light switching is described here. This switching comprises only two lamps with different colour temperatures, but it has an active control arrangement 10,11,12. Active control means automatic adjustment, which is preferably carried out by examining the light of the environment by sensing module 12, is communicated to voltage adjustment devices 10 and 11 so as to continuously control the light output of lamps 1 and 2 respectively. Manual control of voltage adjustment devices 10 and 11 is also possible. Preferably the control arrangement can include a controller within the sensor 12 module. The control arrangement also includes resetting to the basic adjustment and, a default adjustment according to the diurnal rhythm etc. The adjustment is continuous and is based on a gradual adjustment of two different lamps while the total light intensity remains constant. Thus only one of the lamps is lit with the lowest colour temperature, as well as with the highest. In the middle of the adjustment range, both lamps are lit with half the light intensity, whereby their combined effect is equal to one fully lit lamp, and the colour temperature is midway between the colour temperatures of the lamps. The lamps are here assumed to have equal light intensity, and they are preferably so also in practice.

The invention is not limited to the above embodiments only, but it can be modified in many ways without departing from the scope defined by the attached claims.

What is claimed is:

1. A method for adjusting a visible light colour temperature in a back-lit liquid crystal display, wherein the liquid crystal display is lit by two or more background lit light lamps with different visible light colour temperatures, said lit lamps forming part or all of a group of lamps, said method comprising the following steps:

selectively activating said two or more lamps from said group of lamps wherein each lit lamp produces a different visible light colour temperature which collectively forms a combined resultant visible light colour temperature to illuminate the back-lit liquid crystal display; and fine-tuning the resultant colour temperature based upon environmental lighting conditions wherein the liquid crystal display is viewed, by selectively adjusting the lamps which are activated with different colour temperatures.

2. A method according to claim 1, characterized in that the background light lamps with different colour temperatures are switched (7, 9) separately for setting the colour temperature (8) of the display.

3. A method according to claim 1, characterized in that brightness of background light lamps with different colour temperatures is adjusted separately for setting the colour temperature (8).

4. A method according to claim 3, characterized in that light of the background light lamps is transferred to the liquid crystal display by a photoconductor.

5. A back-lit liquid crystal display, comprising two or more background lit light lamps with different visible light colour temperatures (LAMP 1, 2, 3, 4, 5) for background lighting of the liquid crystal display (4) and a switch (S1) for lighting the background light lamps with different visible light colour temperatures (LAMP 1, 2, 3, 4, 5) and wherein the switch enables continuous fine-tuning of a desired overall resultant visible light colour temperature resulting from a combination of lit background lamps, from a first situation in which a first lamp with lowest colour temperature (LAMP1) is fully and solely lit to a situation wherein a number of lamps are lit at fractional intensities to produce a desired overall resultant visible light colour temperature, to a situation in which a last lamp with highest colour temperature (LAMP5) is fully and solely lit, so that a highly adjustable, and fine-tunable, resultant colour temperature is produced and passed to the display.

6. A liquid crystal display according to claim 5, characterized in that the switch is a selection switch (S1).

7. A liquid crystal display according to claim 5, characterized in that the switch is a continuous-state controller enabling continuous adjustment from a situation in which a lamp with lowest colour temperature (LAMP1) is lit to a situation in which a lamp with highest colour temperature (LAMP5) is lit so that total light intensity remains essentially constant.

8. A liquid crystal display according to claim 7, characterized in that it also comprises a light conductor (3) for transferring light from the background light lamps (LAMP 1, 2, 3, 4, 5) to the liquid crystal display.

9. A method according to claim 1, characterized in that light of the background light lamps is transferred to the liquid crystal display by a photoconductor.

10. A method according to claim 2, characterized in that light of the background light lamps is transferred to the liquid crystal display by a photoconductor.

11. A liquid crystal display according to claim 5, characterized in that it also comprises a light conductor (3) for transferring light from the background light lamps (LAMP 1, 2, 3, 4, 5) to the liquid crystal display.

12. A liquid crystal display according to claim 6, characterized in that it also comprises a light conductor (3) for transferring light from the background light lamps (LAMP 1, 2, 3, 4, 5) to the liquid crystal display.

13. The method of claim 1, wherein an overall brightness of the back-lit liquid crystal display is maintained during activation of the respective lamps to form a resultant colour temperature.

14. The display of claim 5, wherein in all combinations of lit lamps the total visible light intensity and brightness of the back-lit display remains constant regardless of any adjustment or fine-tuning of the resultant colour temperature.

15. The method of claim 1, wherein the fine tuning is additionally accomplished with a passive adjustment step using a liquid crystal element.

16. The display of claim 5, wherein a liquid crystal element is included to additionally fine-tune the desired overall resultant visible light colour temperature.

* * * * *